Nov. 12, 1929.  C. A. JOHNSON  1,734,971

OUTLET BOX

Filed Oct. 31, 1924

Inventor
Chester A. Johnson.
By Chindahl Parker & Carlson
Attys.

Patented Nov. 12, 1929

1,734,971

UNITED STATES PATENT OFFICE

CHESTER A. JOHNSON, OF CHICAGO, ILLINOIS, ASSIGNOR TO JEFFERSON ELECTRIC COMPANY, OF CHICAGO, ILLINOIS, A CORPORATION OF ILLINOIS

OUTLET BOX

Application filed October 31, 1924. Serial No. 746,930.

This invention relates to the art of outlet boxes for use in wiring buildings and it refers more particularly to a means for securing to the box the ends of flexible conduits which project through the usual holes in the box wall.

The general object of the invention is to provide an extremely simple and cheap but very effective clamp for gripping the end of a flexible conduit and also to provide a double clamp arranged to secure two adjacent conduits.

Another object is to provide a clamp of this character which may be stamped out of a flat sheet of metal.

A further object is to provide a clamp which is operable by deformation of the metal to perform its clamping function.

A further object is to provide in combination with an outlet box a clamp which is constructed and mounted in the box in such a manner that the deformation of the metal to cause the clamping action may be effected quickly and conveniently by a simple tool such as a screw driver.

Figure 1:
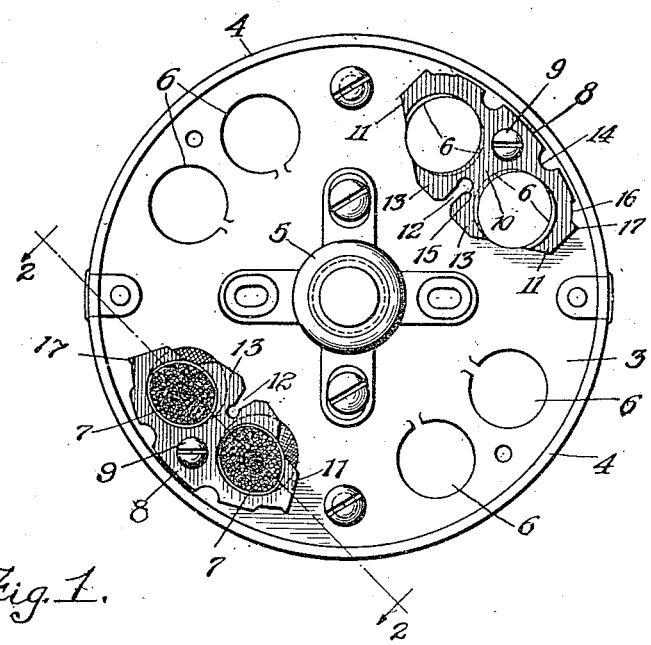

Further objects and advantages of the invention will become apparent from the following detailed description taken in connection with the accompanying drawings in which Figure 1 is an elevational view showing the inside of an outlet box equipped with two clamps embodying my invention, one of the clamps being in its original condition and the other being deformed to grip a pair of conduits.

Figure 2:
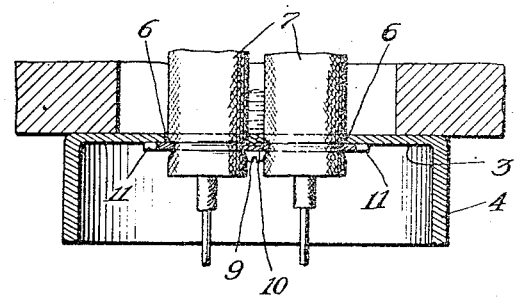

Fig. 2 is a sectional view taken in the plane of line 2—2 of Fig. 1 looking in the direction of the arrows.

In the operation of wiring a building the ends of conduits adjacent to the outlet or switch boxes are stuck through holes in the boxes, and means must be provided for securing the conduits in place to prevent longitudinal movement thereof in the holes. My clamp is useful more particularly for securing flexible conduit such as loom conduit or armoured cable. Inasmuch as this clamping means is frequently difficult of access, it is desirable that such means be simple and easily operable.

In the preferred embodiment of my invention, which is herein shown by way of example, the outlet box is of circular form comprising a base wall 3 and a peripheral wall 4. A stud or support 5 may be fixed to the base wall 3, to which stud a lighting fixture is adapted to be secured.

In the base wall of the box is a plurality of circular holes 6 which normally are closed by the usual knock-out plugs, the latter being removed by the workman at the points at which he desires to introduce conduits into the box. One pair of such conduits is shown in the drawings and is designated 7.

The clamp 8 embodying my invention is preferably in the form of a flat plate which lies against the base wall of the outlet box and is secured thereto by suitable means, which, in the present instance, consists of a screw 9 passing through a hole in the central part of the clamp and threaded into the box wall.

The holes 6 in the box wall are usually arranged in pairs. The clamp in its preferred form is therefore designed to provide two pairs of clamping jaws each pair of which is associated with one of the pair of openings. The clamp comprises a central portion 10 which receives the mounting screw 9, from which central portion two arcuate end wings 11 project, and the free end of this central portion is bifurcated or slotted as at 12 to provide two central wings 13 to cooperate with the end wings 11. One of the ends wings 11 and one of the central wings 13 constitute a pair of jaws to grip a conduit.

The central portion 10 and end wings 11 forming one edge of the clamp lie close to and are curved to conform to the peripheral wall 4 of the box. Rotation of the clamp as a whole about the screw 9 is thereby prevented and the clamp is held in proper relation to the holes 6 in the box.

The clamp shown at the upper right hand side of Fig. 1 is in its normal shape or condition while the one at the lower left hand side of the figure is shown as deformed to clamp a pair of conduits 7. The deformation may easily be effected with an ordinary screw driver by inserting the blade of the screw driver into the slot 12 of the central portion and twisting the blade to spread the two wings 13 apart. Each of the end wings 11 may be forced inwardly by inserting the blade of a screw driver between the peripheral wall 4 of the box and the end of the wing and twisting the blade to force the wing away from said wall.

Preferably the end wings are weakened near their junction with the central portion as by forming notches 14 therein so as to facilitate the bending of the wings. The central wings 13 may be similarly treated by forming an enlarged opening 15 at the end of the slot 12. I have found it preferable to provide a recess 16 or a projection 17 on the end wings 11 to coact with or catch the screw driver blade and prevent the blade from slipping as it is being twisted to deform the wing.

By reference to the upper right hand clamp in Fig. 1 it will be noted that the width of the central portion 10 is slightly greater than the width of the metal between the two adjacent holes 6 so that the central portion of the clamp slightly overhangs the holes. The end wings, however, preferably do not overhang the holes and are shown as spaced away from the edges of the holes. The reason for this arrangement is that it is considered preferable that the conduit will be held between the opposing portions of each individual clamp instead of being held partially by engagement with the edge of the hole 6 in the box. It is found that a more effective grip on the conduit may be had in this way as will be understood by reference to the lower left hand clamp in Fig. 1 of the drawing.

It will be understood that each pair of wings of the clamp grips its conduit independently of the other, there being two clamps integral with each other. Where only one conduit is to be secured a single clamp comprising only two wings may be used. Although it is preferable to bend both wings toward each other, gripping action may be obtained by bending only one wing toward the other.

While I have shown in the drawings the preferred embodiment of my invention I recognize that many alternatives and equivalents may be devised without departing from the spirit and scope of the invention and therefore do not limit myself to the exact construction disclosed except as specified in the appended claims and necessitated by the state of the prior art.

I claim as my invention:

1. In combination with an outlet box having a base wall and a peripheral wall and having a pair of holes in said base wall, a conduit clamp comprising a flat plate lying along said base wall, means for securing said plate to said base wall, said plate comprising a central portion having a pair of oppositely projecting end wings and having relatively weak connecting portions between the wings and the central portion and a pair of central wings, said central wings having a slot between them adapted to receive a screw driver for spreading them apart, the edge of the clamp which is formed by the central portion and end wings lying close to the peripheral wall of the box and conforming in shape thereto, a space being provided between each end wing and said peripheral wall to receive a screw driver for forcing said end wing away from said peripheral wall, one end wing and one central wing constituting a clamp having an embracing relation to one of said holes in the box whereby to grip a conduit passing through such hole.

2. In combination with an outlet box having a base wall and a peripheral wall and having a pair of holes in said base wall to receive conduits, a clamp comprising a flat plate lying along said base wall and having two pairs of wings, each pair having an embracing relation to a conduit passing through one of said holes, the plate being structurally weakened to permit deformation by moving the wings toward the conduit in the plane of the plate to clamp the plate to conduits passing through said holes, and means for securing said plate to said box.

3. In combination with an outlet box having a hole in one wall, a conduit clamp having a pair of wings occupying an embracing relation to a conduit entering said hole, the clamp being structurally weakened in the plane of the wings to facilitate deformation by a manual installing operation comprising pressing said wings toward each other to grip a conduit otherwise freely movable in said hole, and means for securing said clamp to the box.

4. In combination with an outlet box having a pair of holes to receive conduits, a clamp having two pairs of wings each occupying an embracing relation to a conduit entering one of said holes and normally permitting free insertion and withdrawal of a conduit, parts of the clamp being weakened to facilitate bending of the respective wings of each pair toward each other in the plane of the plate to clamp the conduits immovably in said holes, and means for securing said clamp to the box.

5. A conduit clamp in the form of a flat plate having a central portion bifurcated at one end to form two wings, and having two wings projecting in opposite directions from its other end, parts thereof being structurally weak to permit bending of the wings of each pair toward each other in the plane of the plate to grip a conduit.

6. A conduit clamp in the form of a plate adapted to be secured to the inner wall of a box and having a pair of wings between which a conduit may normally be freely inserted and withdrawn, said wings having a part thereof structurally weak to facilitate deformation of said wings by bending said wings toward each other to grip the conduit.

7. A conduit clamp in the form of a plate adapted to be secured to the inner wall of an outlet box comprising a base portion and a pair of spaced arcuate wings projecting therefrom arranged normally to permit a conduit to be freely inserted therebetween, the clamp having a part thereof structurally weak and a slot adjacent said part adapted to receive a tool for bending one wing toward the other inherently to clamp a conduit immovably between them.

8. In combination with an outlet box having a pair of adjacent holes in one wall adapted to receive conduits, a clamp comprising a central portion overlying and wider than the space between said holes and two pairs of arcuate wings projecting in opposite directions from said central portion, parts of the clamp being weak to permit deformation thereof by bending one wing of each pair toward the other in the plane of the central portion so as to grip a pair of conduits projecting through said holes, and means for securing said clamp to said outlet box.

In testimony whereof, I have hereunto affixed my signature.

CHESTER A. JOHNSON.